(12) United States Patent
Suzuki

(10) Patent No.: US 7,194,742 B2
(45) Date of Patent: Mar. 20, 2007

(54) INFORMATION MANAGEMENT SYSTEM AND INFORMATION MANAGEMENT METHOD FOR NETWORK

(75) Inventor: Junji Suzuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 602 days.

(21) Appl. No.: 10/171,636

(22) Filed: Jun. 17, 2002

(65) Prior Publication Data

US 2002/0199028 A1 Dec. 26, 2002

(30) Foreign Application Priority Data

Jun. 22, 2001 (JP) ............................ 2001-189081

(51) Int. Cl.
*G06F 3/00* (2006.01)
(52) U.S. Cl. ........................... 719/310; 705/26; 705/27; 707/1; 707/100; 709/201; 709/202; 709/203; 713/150; 715/700; 715/733; 715/741; 715/744
(58) Field of Classification Search ................ 719/310; 705/26–27; 707/1–100; 709/201–203; 713/150; 715/700, 733, 741, 744
See application file for complete search history.

(56) References Cited

U.S. PATENT DOCUMENTS 6,591,266 B1 * 7/2003 Li et al. ....................... 707/10

2002/0083095 A1 * 6/2002 Wu et al. .................... 707/513
2002/0108057 A1 * 8/2002 Zhanhong Wu et al. .... 713/201
2002/0120864 A1 * 8/2002 Wu et al. .................... 713/201

FOREIGN PATENT DOCUMENTS

| JP | 08-185441 | | 7/1996 |
| JP | 08-263258 | | 10/1996 |
| JP | 11-017675 | A | 1/1999 |
| JP | 11120127 | A * | 4/1999 |
| JP | 2000-123078 | A | 4/2000 |
| JP | 2000-194559 | | 7/2000 |
| JP | 2000-250993 | A | 9/2000 |
| JP | 2000-322440 | A | 11/2000 |

* cited by examiner

*Primary Examiner*—Meng-Al T. An
*Assistant Examiner*—Qing-Yuan Wu
(74) *Attorney, Agent, or Firm*—Oliff & Berridge, PLC

(57) ABSTRACT

User-related data including personal information of a user are stored in a user management computer, which is included in an information management system for a network. An ID and a password exclusively used for opening the user's exclusive page, My Page, provided via the Internet are allocated to the user. In response to the user's input of the ID and the password by telephone or facsimile, the information management system adjusts My Page data based on the user-related data, stores the adjusted My Page data into a My Page server, and opens My Page of the user. This arrangement effectively prevents the personal information of the user from being stored in a server without permission of the user, while simplifying the operations required for opening My Page.

17 Claims, 6 Drawing Sheets

FIG.2

FOR OPENING MY PAGE

1. For Opening My Page by Telephone
   Call 0120—XXXX—XXXX and input ID and Password by voice entry or dial tone entry according to its voice guide.

2. For Opening My Page by Facsimile
   Facsimile this form to 0120—YYYY—YYYY

3. For Opening My Page by the Internet
   Access My Page opening site (URL: www.abcd.co.jp/efghijk/) and input ID and Password.

Your ID is IDXXXXXX..
Your password is PASYYYYY.

The display on My Page may be restricted. When you open My Page by facsimile, fill checkboxes of items you desire no display on My Page.

☐ Name         ☐ Postal Address
☐ Telephone Number  ☐ Mail Address

FIG.6

FOR INSTANTLY OPENING MY PAGE

Input ID and password for opening My Page.

Your ID

Password

Tick checkboxes of items you desire no display on My Page.

☐ Name  ☐ Postal Address
☐ Telephone Number  ☐ Mail Address

INFORMATION MANAGEMENT SYSTEM AND INFORMATION MANAGEMENT METHOD FOR NETWORK

BACKGROUND OF THE INVENTION

1. Field of the Invention

The present invention relates to an information management system for a network and a corresponding information management method.

2. Description of the Prior Art

One proposed information management system for the network utilizes information including personal information of each user and opens a user's exclusive page in a network server connecting with an open network, such as the Internet, without any specific permission of the user. Another proposed information management system requires the user to access the network server via the network and directly input personal information into the network server to open the user's exclusive page.

In the system of opening the user's exclusive page in the network server without permission of the user, however, there is a possibility that the personal information of the user is leaked to the network against the user's intention by a third person's illegal action like hacking or malfunction of the network server, since the network server is connected to the open network.

In the system of opening the user's exclusive page in the network server according to the user's direct input of the personal information via the network, on the other hand, the user is required to input diverse pieces of the personal information to open the user's exclusive page. This undesirably requires intricate operations for opening the user's exclusive page. Any of the prior art systems manages the information regarding the items purchased by each user only after opening the user's exclusive page. The information regarding the items purchased by the user before opening the user's exclusive page is thus not reflected on the user's exclusive page.

SUMMARY OF THE INVENTION

The object of the present invention is thus to prevent personal information of any user from being stored in a network server connecting with an open network without permission of the user. The object of the invention is also to simplify input operations of personal information in the process of opening each user's exclusive page. The object of the invention is further to open each user's exclusive page including information regarding all items purchased by the user at any time by any purchasing method.

In order to achieve at least a part of the aforementioned objects, the present invention is structured as follows.

An information management system for a network of the present invention is an information management system for a network, including:

a first user information storage module that stores first user information including personal information of a user and predetermined information relating to the user;

a network server that stores third user information including second user information mapped to the user and the predetermined information relating to the user, and in response to a specified requirement with a preset output condition sent from the user via an open network, outputs a user's exclusive page to the user who has sent the requirement, where the user's exclusive page includes at least part of the third user information corresponding to the user who has sent the requirement; and an information adjustment output module that is connected to the network server, and in response to a requirement with a preset permission condition sent from the user, adjusts the third user information corresponding to the user based on the first user information stored in the first user information storage module and outputs the adjusted third user information to be stored in the network server.

In response to a user's requirement with a preset permission condition, the information management system of the present invention adjusts the third user information including the second user information mapped to the user and the predetermined information relating to the user, based on the first user information including the personal information of the user and the predetermined information relating to the user stored in the first user information storage module. The information management system then outputs the adjusted third user information to be stored in the network server connecting with the open network. In response to a specified requirement with a preset output condition, the network server having the third user information stored therein outputs a user's exclusive page, which includes at least part of the third user information corresponding to the user, to the user who has sent the requirement. In the information management system of the present invention, the third user information is adjusted and stored in the network server, in response to the user's requirement with the preset permission condition. This arrangement thus effectively prevents the personal information of any user from being stored into the network server connecting with the open network without permission of the user. In response to the simple requirement of the user with the preset permission condition, the system adjusts the third user information based on the first user information stored in the first user information storage module, stores the adjusted third user information into the network server, and outputs the user's exclusive page. This arrangement desirably simplifies the user's operations required for opening the user's exclusive page. Regardless of the time of opening the user's exclusive page, all or part of the personal information of the user and the predetermined information relating to the user stored in the first user information storage module may be reflected on the user's exclusive page.

In the information management system of the present invention, the second user information can include at least part of the personal information. Here the personal information may be diverse pieces of information, such as the name, the postal address, the telephone number, and the E-mail address.

In the information management system of the present invention, the information adjustment output module can output at least part of the first user information to the network server as the third user information. The information adjustment output module is not restricted to means of adjusting the information and outputting the adjusted information, but maybe means of simply outputting all the information or means of selectively outputting part of the information.

In the information management system of the present invention, the information adjustment output module can select a piece of information to be included in the second user information, out of the personal information and adjust the third user information based on the selected piece of information. Moreover, in the information management system of the present invention, the predetermined information relating to the user can include information relating to an item purchased by the user or can include information relating to repair of an item purchased by the user. In addition, in the information management system of the present invention, the preset output condition can be input of identification information allocated to the user for identification of the user.

In the information management system of the present invention, the preset permission condition can be input of identification permission information allocated to the user for identification of the user and for adjustment of the third user information and storage of the adjusted third user information into the network server. Here, the identification permission information may be input by any of diverse methods, for example, by telephone, by facsimile, by direct mail, by electronic mail, or in the form of documentation wrapped with a purchased item.

In the information management system of the present invention, the information adjustment output module can accept the requirement with the preset permission condition via the network server. In this case, the information adjustment output module can recognize a voice input via a communication line and accept the requirement with the preset permission condition or can recognize a dial tone input via a communication line and accept the requirement with the preset permission condition or can accept the requirement with the preset permission condition through character recognition of an image input via a communication line.

An information management method of the present invention is an information management method adopted in an information management system for a network, which includes: a database that stores first user information including personal information of a user and predetermined information relating to the user; and a network server that stores third user information including second user information mapped to the user and the predetermined information relating to the user, and in response to a specified requirement with a preset output condition sent from the user via an open network, outputs a user's exclusive page to the user who has sent the requirement, where the user's exclusive page includes at least part of the third user information corresponding to the user who has sent the requirement, the information management method including the steps of:

(a) accepting a requirement with a preset permission condition sent from the user;

(b) adjusting the third user information corresponding to the user based on the first user information stored in the database in response to the requirement; and (c) storing the adjusted third user information into the network server.

The information management method of the present invention adjusts the third user information based on the first user information stored in the database and stores the adjusted third user information into the network server, in response to a simple requirement of the user with a preset permission condition. This arrangement effectively prevents the personal information of any user from being stored in the network server connecting with the open network. This arrangement also desirably simplifies the user's operations required for opening the user s exclusive page. This arrangement further enables the second user information mapped to the user to be reflected on the user's exclusive page, regardless of the time of opening the user's exclusive page.

In the information management method of the present invention, the step (b) can adjust the third user information to include at least part of the personal information or can carry out the adjustment to specify at least part of the first user information as the third user information or can select a piece of information to be included in the second user information, out of the personal information and adjust the third user information based on the selected piece of information.

In the information management method of the present invention, the predetermined information relating to the user can include information relating to an item purchased by the user or can include information relating to repair of an item purchased by the user.

Further, in the information management method of the present invention, the preset output condition can be input of identification information allocated to the user for identification of the user or the preset permission condition can be input of identification permission information allocated to the user for identification of the user and for adjustment of the third user information and storage of the adjusted third user information into the network server.

In the information management method of the present invention, the step (a) can accept the requirement with the preset permission condition via the network server or can recognize a voice input via a communication line and accept the requirement with the preset permission condition or can accept the requirement with the preset permission condition through character recognition of an image input via a communication line.

BRIEF DESCRIPTION OF THE DRAWINGS

FIG. 2 shows an example of notification 'For Opening My Page' sent to a user by direct mail, based on personal information of the user registered at the time of purchase of an item;

FIG. 6 shows a window for instantly opening My Page.

DESCRIPTION OF THE PREFERRED EMBODIMENTS

Figure 1:
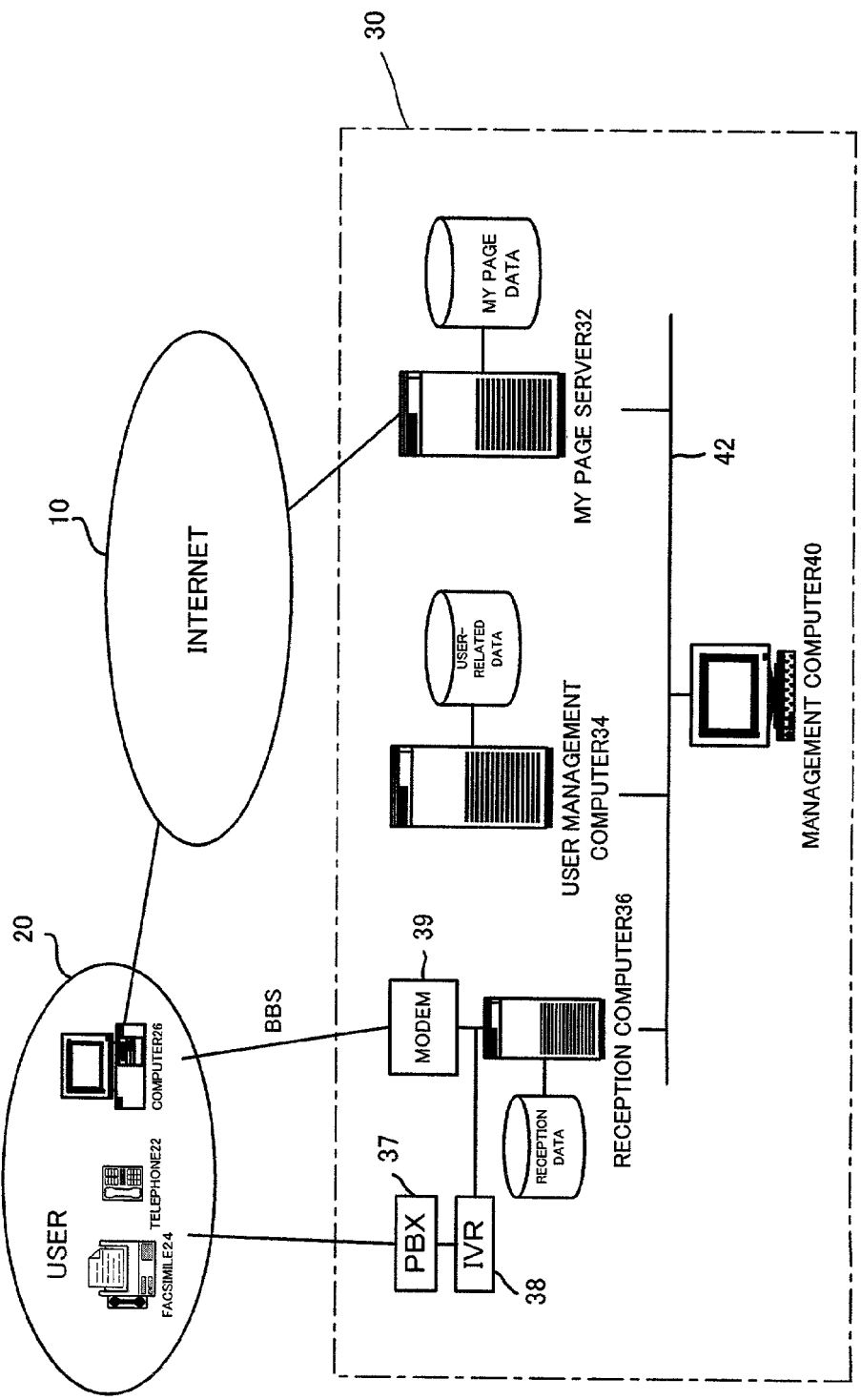
FIG. 1 schematically illustrates the construction of an information management system for a network in one embodiment of the present invention.

One mode of carrying out the present invention is discussed below as a preferred embodiment. FIG. 1 schematically illustrates the construction of an information management system 30 for a network in one embodiment of the present invention. The information management system 30 of the embodiment includes a My Page server 32 that is connected to an open network or the Internet 10 and is accessible from a computer 26 of a user 20 or a computer of any third person, and a user management computer 34 that stores therein user-related data including personal information of the user 20 and commodity-related information regarding items purchased by the user 20. The information management system 30 further includes a reception computer 36 that accepts a My Page opening requirement given by the user 20 with a telephone 22 or a facsimile 24, and a management computer 40 that manages information to adjust My Page data corresponding to the user 20, who has given the My Page opening requirement, and store the adjusted My Page data into the My Page server 32. The respective constituents 32, 34, 36, and 40 are mutually connected via a closed in-house LAN 42.

The My Page server 32 is a Web server that outputs My Page, in response to a requirement from the computer 26 of the user 20 via the Internet 10. My Page is a user's exclusive page to display information regarding the items purchased by the user 20, a functional upgrade record of the items, and a repair record of the items. The My page server 32 also provides a commodity sales and repair site to accept purchase orders and repair orders of items from any third persons as well as from the users who have opened My Page.

The user management computer 34 stores the user-related data and functions as a database. The user-related data includes personal information, such as the name, the postal address, the telephone number, the mail address, the age, and the occupation of the user 20 input with another in-house computer (not shown) connected to the in-house LAN 42, and commodity-related information, such as items purchased by the user 20 at any time by any purchasing method, a record of functional upgrade of the items, a record of repair of the items, and a sum of points given at the time of purchase, functional upgrade or repair of the items.

The reception computer 36 is connected to a public telephone network via a private branch exchange (PBX) 37 and an interactive voice response (IVR) 38 for voice recognition and dial tone recognition. In response to a requirement of opening My Page by the telephone 22, the reception computer 36 accepts input of the ID and the password for opening My Page by voice recognition or dial tone recognition. In response to a requirement of opening My Page by the facsimile 24, the reception computer 36 accepts input of the ID and the password for opening My Page by character recognition. The reception computer 36 then stores the input information including the ID as reception data. The reception computer 36, which is also connected to the public telephone network via a modem 39, accepts input of the ID and the password for opening My Page through data communication in response to a requirement of opening My Page by the computer 26 and stores the input information including the ID as reception data.

The following describes the operations of the information management system 30 of the embodiment thus constructed, especially a procedure of opening My Page. The information management system 30 of the embodiment opens My Page according to either of two procedures. In the first procedure, the user 20 gains access to the My Page server 32 via the Internet 10, enters the personal information including the name, the postal address, the telephone number, and the mail address in a My Page opening window provided by the My Page server 32, and operates an execute button to open My Page. The second procedure receives a requirement of the user who has purchased an item and utilizes the personal information registered at the time of purchase of the item to open My Page. The second procedure is applied to open My Page as the technique of the present invention, while the first procedure is conventional. The following discussion thus mainly regards the process of opening My Page according to the second procedure.

FIG. 2 shows an example of notification 'For Opening My Page' sent to the user 20 by direct mail, based on the personal information of the user 20 registered at the time of purchase of an item. As shown in this notification 'For Opening My Page', the second procedure for opening My Page adopted in the information management system of the embodiment provides three processes, by telephone, by facsimile, and by the Internet. In the case of opening My Page by telephone, the user calls a predetermined telephone number (0120-XXXX-XXXX in the example of FIG. 2) and inputs 'ID' and 'Password' on the notification 'For Opening My Page' by voice entry or dial tone entry according to its voice guide. In the case of opening My Page by facsimile, the user facsimiles the notification 'For Opening My Page' as shown in FIG. 2 to a predetermined FAX number (0120-YYYY-YYYY in the example of FIG. 2). In the case of opening My Page by the Internet, the user enters URL of a My Page opening site provided by the My Page server 32 and inputs 'ID' and 'Password' according to an instruction of the site. The user may also open My Page by personal computer communication. In this case, the user 20 connects the user's own computer 26 to the reception computer 36 via the modem 39 on a communication line and inputs the 'ID' and 'Password' according to an instruction of the reception computer 36.

Figure 3:
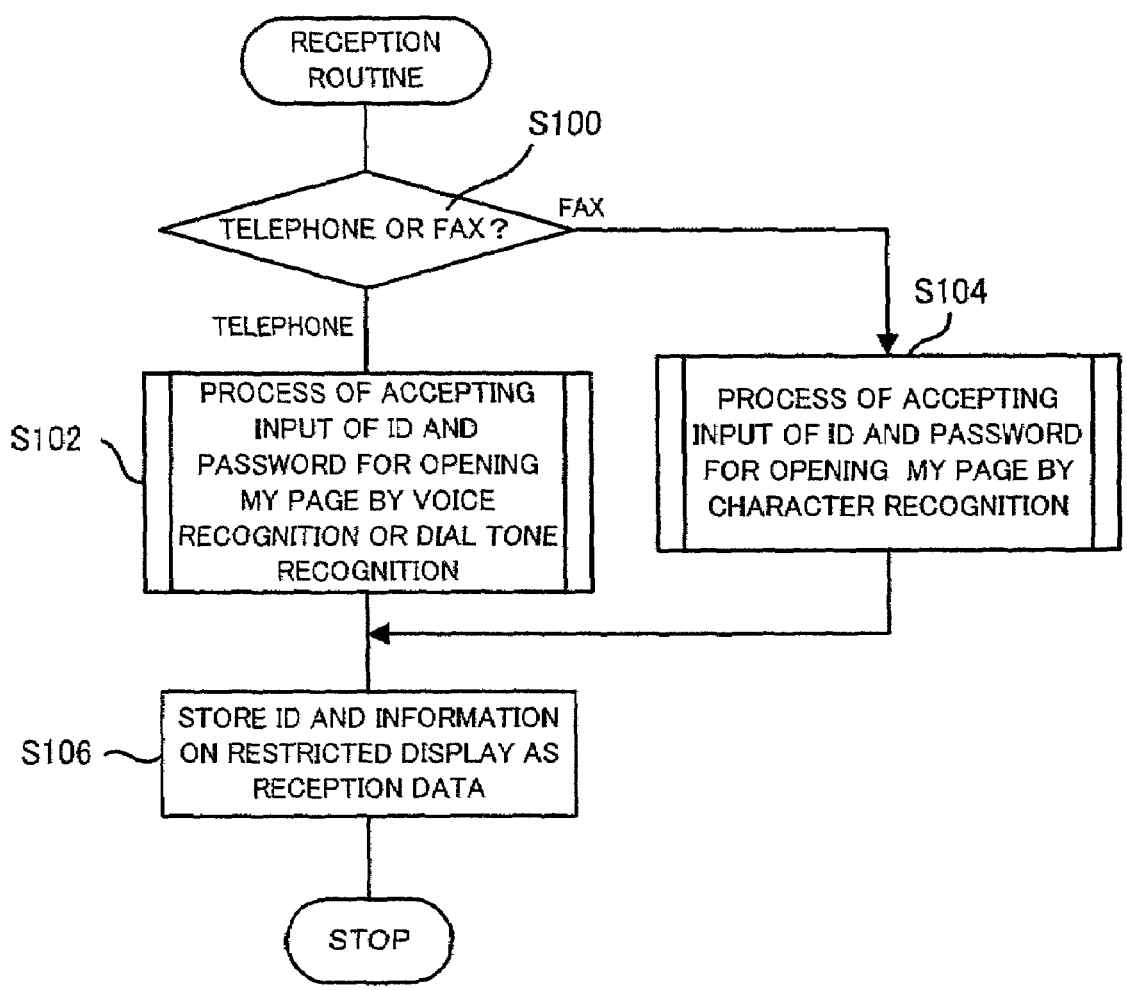
FIG. 3 is a flowchart showing a reception routine executed by a reception computer included in the information management system, in response to a My Page opening requirement from the user with a telephone or a facsimile.

The description first regards the case of opening My Page by telephone and the case of opening My page by facsimile. FIG. 3 is a flowchart showing a reception routine executed by the reception computer 36, in response to a My Page opening requirement from the user 20 with the telephone 22 or the facsimile 24 via the PBX 37 or the IVR 38. When the program enters the reception routine, the reception computer 36 first specifies either the My Page opening requirement by telephone or the My Page opening requirement by facsimile (step S100). The specification of either the telephone or the facsimile is based on a predetermined signal transmitted from the facsimile.

In the case of the My Page opening requirement by telephone, the reception computer 36 carries out a process of accepting the input ID and password for opening My Page by voice recognition or dial tone recognition (step S102). The process first outputs a preset message like 'Welcome to My Page opening site. Please enter your ID' and accepts the subsequent user's voice input or dial tone input of the given ID by known voice recognition or by known dial tone recognition. The process then outputs a message like 'Please enter your password' and accepts the subsequent user's voice input or dial tone input of the given password by voice recognition or by dial tone recognition. The information management system 30 of the embodiment also accepts the user's requirement for restricted display on My page, in addition to the ID and the password. For example, the system outputs a message like 'Please push '1' for display of your name on My Page, and push '0' for no display of your name on My Page' to the user who desires restricted display on My Page, and receives the user's dial tone input of the selected number on the telephone. Diverse pieces of the personal information, such as the postal address, the telephone number, and the mail address, in addition to the name may be subjected to the restricted display on My Page.

In the case of the My Page opening requirement by facsimile, on the other hand, the reception computer 36 carries out a process of accepting the input ID and password for opening My Page by character recognition (step S104). The process first receives the image of the transmitted notification 'For Opening My Page' shown in FIG. 2 and reads the specific part of the input image 'Your ID is IDXXXXXX' and 'Your password is PASYYYY' to accept the input ID and password by known character recognition. The information management system 30 of the embodiment also accepts the user's requirement for restricted display on My page, in the case of the My Page opening requirement by facsimile. The procedure of this embodiment receives the user's requirement for restricted display on My Page, for example, by determining whether or not checkboxes of specified items for restricted display are filled in the transmitted notification 'For Opening My Page' of FIG. 2. The concrete procedure reads the respective checkboxes as an image in the course of accepting the input ID and password and carries out image processing for determination of the marking state.

In either case of the My Page opening requirements by telephone and by facsimile, the reception computer 36 compares the input ID and password with the ID and password stored in the user management computer 34 and accepts the input ID and password only in the case of coincidence. Otherwise the reception computer 36 requests the user to reenter the ID and the password or concludes the reception routine.

On completion of the input process, the reception computer 36 stores the input ID and information regarding the restricted display on My Page as reception data (step S106). The program then exits from this reception routine.

Figure 4:
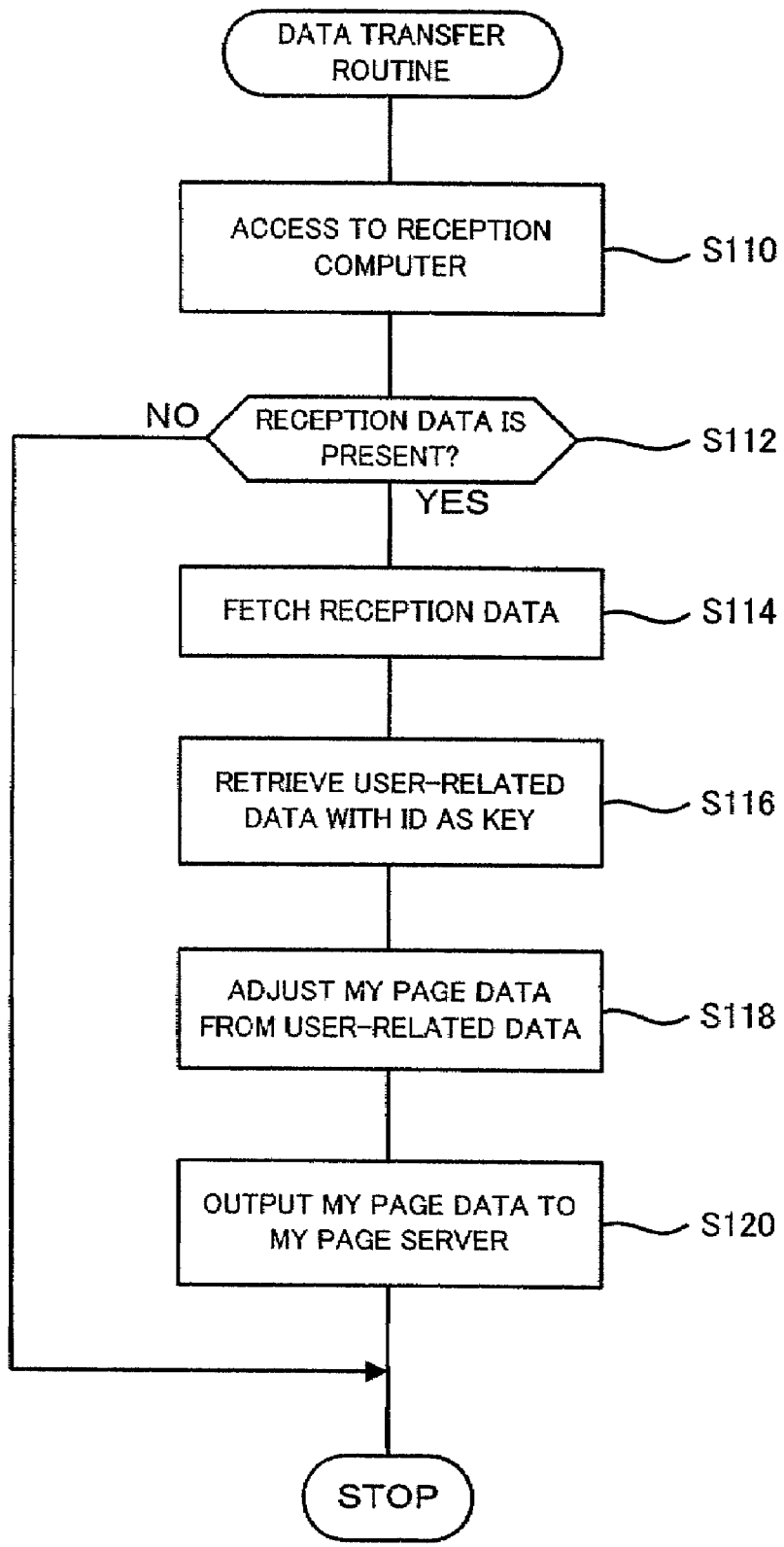
FIG. 4 is a flowchart showing a data transfer routine executed by a management computer included in the information management system.

The reception data stored in the reception computer 36 is used for a data transfer process, which is executed by the management computer 40 at predetermined time intervals. FIG. 4 is a flowchart showing a data transfer routine executed by the management computer 40.

When the program enters the data transfer process, the management computer 40 first gains access to the reception computer 36 (step S110) and specifies the existence or non-existence of reception data (step S112). When the reception data is present, the management computer 40 fetches the reception data from the reception computer 36 (step S114), gains access to the user management computer 34 by using the ID included in the fetched reception data as a key, and retrieves the user-related data specified by the ID (step S116). The management computer 40 then adjusts My Page data from the retrieved user-related data, based on the information regarding the restricted display on My Page included in the reception data (step S118). The adjustment of My Page data deletes information of selected items for restricted display on My Page from the user-related data, and sets the ID and the password for opening My Page to an ID and a password that the user should enter to access the My Page server 32 via the Internet 10 and output My Page.

The management computer 40 subsequently gains access to the My Page server 32 and stores the adjusted My Page data into the My Page server 32 (step S120). The program then exits from this data transfer routine.

On completion of the data transfer process, the My Page data is stored in the My Page server 32. Here the My Page data includes the personal information of the user 20, who has given the My Page opening requirement, out of the range of restricted display and the commodity-related information, such as items purchased by the user 20, a record of functional upgrade of the items, a record of repair of the items, and a total point given to the user 20. When the user 20 gains access to the My Page server 32 from the computer 26 and enters the ID and the password for outputting My Page, the My Page reflecting the My Page data of the user 20 is output from the My Page server 32. As described previously, the user-related data including items purchased by the user 20 at any time by any purchasing method, a record of functional upgrade of the items, a record of repair of the items, and a total point are stored in the user management computer 34. The My Page data is adjusted from the user-related data, so that the output My Page reflects the information on all the items purchased by the user 20 before the My Page opening requirement, regardless of the purchasing method like by telephone or via the Internet.

Figure 5:
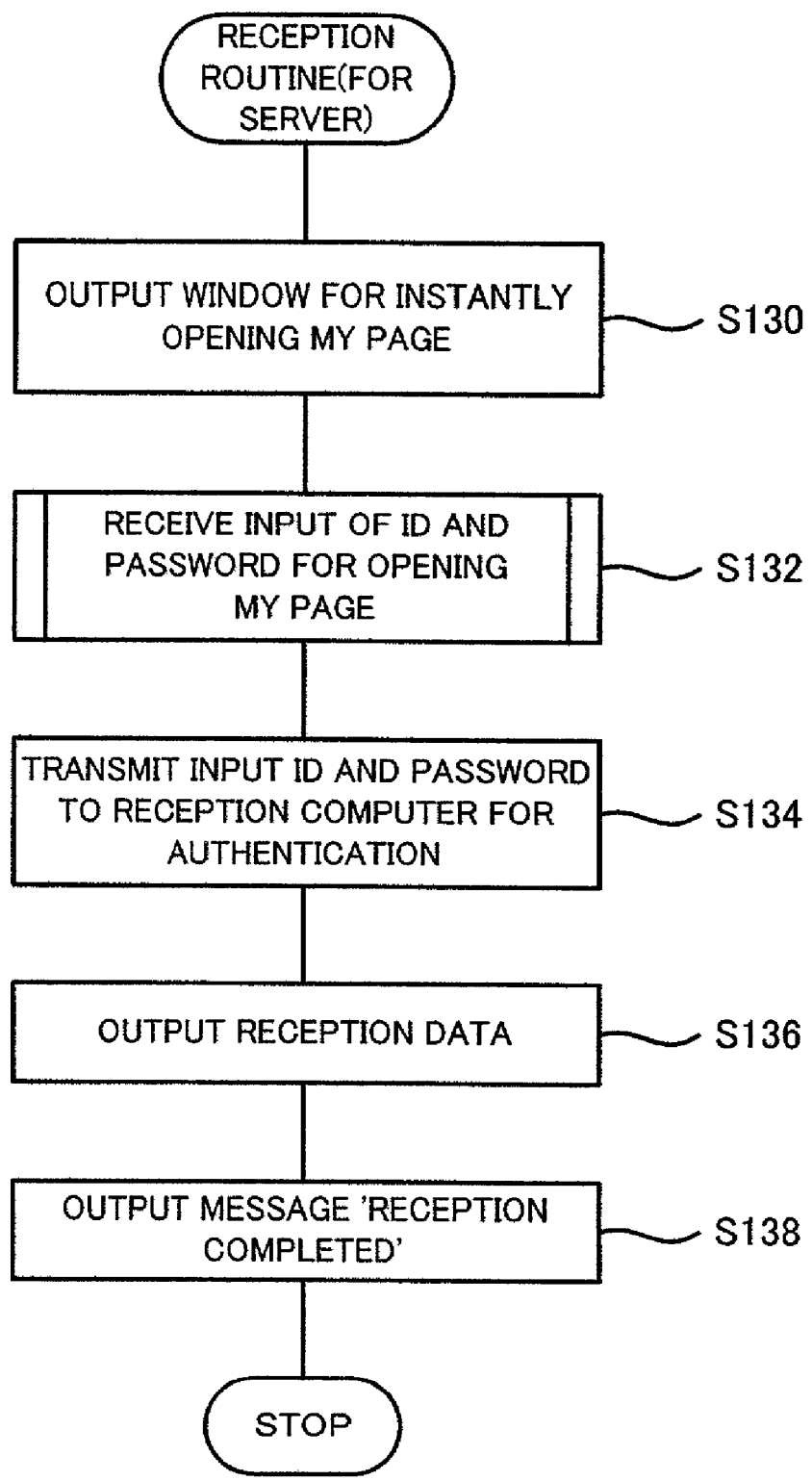
FIG. 5 is a flowchart showing a reception routine executed by a My Page server included in the information management system.

The following description regards the case of opening My Page by the Internet. FIG. 5 is a flowchart showing a reception routine executed by the My Page server 32. This reception routine is executed when the user 20 gains access to the My Page server 32 from the computer 26 and requests output of a window for instantly opening My Page, which is different from the My Page opening window described above as the first procedure. When the program enters this reception routine, the My Page server 32 outputs a window for instantly opening My Page in response a requirement of the user 20 (step S130). The My Page server 32 receives the user's input of the ID and the password for opening My Page (step S132). FIG. 6 shows an example of the window for instantly opening My Page. The user enters the ID and the password on the notification 'For Opening My Page' shown in FIG. 2 into input boxes of 'Your ID' and 'Password' shown in FIG. 6. In order to allow simultaneous input of a requirement for restricted display on My Page with input of the ID and the password, the window for instantly opening My Page includes selectable items for restricted display on My Page and checkboxes allocated to the respective selectable items.

The My Page server 32 specifies the input ID and the information regarding restricted display on My Page as the reception data, gains access to the reception computer 36, and transmits the input ID and password for authentication (step S134). The My Page server 32 stores the reception data into the reception computer 36 (step S136) and outputs a message 'Reception completed' to the computer 26 of the user 20 (step S138). The program then exits from this reception routine.

In the case of opening My Page by the Internet, the reception data is stored in the reception computer 36. The data transfer process discussed above with reference to the flowchart of FIG. 4 is accordingly carried out to adjust the My Page data for the user 20 who has given the My Page opening requirement to the My Page server 32 and store the adjusted My Page data in the My Page server 32. The My Page server 32 outputs the My Page of the user 20 in response to a requirement of the user 20 via the Internet 10.

The series of processing for opening My Page through personal computer communication basically follows the procedure for opening My Page by telephone or by facsimile, except voice recognition or character recognition, and is thus not specifically described here.

As described above, when the user 20 simply inputs the ID and the password on the notification 'For Opening My Page' received by direct mail by any of the specified means, the information management system 30 of the embodiment adjusts the My Page data including the personal information from the user-related data stored in the user management computer 34, stores the adjusted My Page data into the My Page server 32 accessible via the Internet 10, and outputs the user's exclusive My Page. The system of the embodiment does not require entry of diverse information other than the ID and the password and thus simplifies the user's input operations for opening My Page. The system adjusts the My Page data based on the user-related data stored in the user management computer 34 in response to the user's requirement, and stores the adjusted My Page data in the My Page server 32 connecting with the open network, the Internet. This arrangement effectively prevents the personal information of any user from being stored in a network server connecting with the open network without permission of the user.

The information management system 30 of the embodiment opens My Page in response to the user's My Page opening requirement with simple entry of the ID and the password by telephone or by facsimile. The My Page opening requirement may otherwise be given by entering the ID and the password via the Internet 10.

The information management system 30 of the embodiment also accepts the requirement for restricted display on My Page in the course of entry of the ID and the password for opening My Page. The My Page data stored in the My Page server 32 may thus not include all or part of the personal information.

The information management system 30 of the embodiment adjusts the My Page data from the user-related data, which includes items purchased by the user 20 at any time by any purchasing method, a record of functional upgrade of the items, a record of repair of the items, and a total point. The information regarding the items purchased by telephone prior to the My Page opening requirement and the points, as well as the items purchased via the Internet 10 can thus be reflected on the user's My Page.

The information management system 30 of the embodiment accepts the My Page opening requirements by telephone, by facsimile, and via the Internet. The My Page opening requirements may be accepted only by telephone and by facsimile or only either by telephone or by facsimile. The My Page opening requirements may be given by any suitable means other than the telephone, the facsimile, or the Internet.

The information management system 30 of the embodiment accepts the requirement for restricted display of all or part of the personal information on My Page in the course of entry of the ID and the password for opening My Page. One possible modification may accept the requirement for restricted display of information other than the personal information on My Page. Another possible modification may not accept the requirement for restricted display on My Page. In the last case, the My Page data may be adjusted to be identical with the user-related data or to be part of the user-related data.

In the information management system 30 of the embodiment, the management computer 40 gains access to the reception computer 36 to check the presence or absence of the reception data. In the presence of the reception data, the management computer 40 adjusts the My Page data and stores the adjusted My Page data in the My Page server 32. In one possible modification, on conclusion of the reception process, the reception computer 36 gains access to the user management computer 34 based on the input reception data, adjusts the My Page data, and stores the adjusted My Page data in the My Page server 32. In another possible modification, the user management computer 34 gains access to the reception computer 36 to check the presence or absence of the reception data, adjusts the My Page data in the presence of the reception data, and stores the adjusted My Page data in the My Page server 32. In still another possible modification, the My Page server 32 gains access to the reception computer 36 to check the presence or absence of the reception data, adjusts the My Page data in the presence of the reception data, and stores the adjusted My Page data therein.

In the information management system 30 of the embodiment, the reception computer 36 accepts the My Page opening requirements by telephone and by facsimile. The user management computer 34 may alternatively accept the My Page opening requirements by telephone and by facsimile.

The information management system 30 of the embodiment sends the notification 'For Opening My Page' to the user by direct mail. The notification 'For Opening My Page' may be sent to the user by electronic mail, may be wrapped with a purchased item, or may be given by telephone or by facsimile.

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. An information management system for a network, comprising;
    a first user information storage module that stores first user information, the first user information comprising personal information of a user and predetermined information relating to the user;
    a network server that stores third user information, the third user information comprising second user information associated with the user and the predetermined information relating to the user, wherein the second user information comprising at least some of the personal information of the user, and in response to a specified requirement with a preset output condition sent from the user via an open network, the network server outputs a user's exclusive page to the user who has sent the requirement, where the user's exclusive page includes at least part of the third user information corresponding to the user who has sent the requirement;
    a requirement accept module configured to accept a requirement with a preset permission condition sent from the user via said network server, through voice recognition, through dial tone recognition, or through character recognition; and
    an information adjustment output module that is connected to said network server, and in response to an acceptance of the requirement with the preset permission condition sent from the user by said requirement accept module, the information adjustment output module creates and adjusts third user information corresponding to the user based on the first user information stored in said first user information storage module and outputs the adjusted third user information to be stored in said network server, the information adjustment output module being capable of displaying on the user's exclusive page all or part of the personal information of the user and the predetermined information relating to the user stored in the first user information storage module, regardless of the time of opening the user's exclusive page.

2. An information management system in accordance with claim 1, said information adjustment output module outputting at least part of the first user information to said network server as the third user information.

3. An information management system in accordance with claim 1, said information adjustment output module selecting a piece of information to be included in the second user information, out of the personal information and adjusting the third user information based on the selected piece of information.

4. An information management system in accordance with claim 1, the predetermined information relating to the user including information relating to an item purchased by the user.

5. An information management system in accordance with claim 1, the predetermined information relating to the user including information relating to repair of an item purchased by the user.

6. An information management system in accordance with claim 1, the preset output condition being input of identification information allocated to the user for identification of the user.

7. An information management system in accordance with claim 1, the preset permission condition being input of identification permission information allocated to the user for identification of the user and for adjustment of the third user information and storage of the adjusted third user information into said network server.

8. An information management system in accordance with claim 1, the predetermined information relating to the user at least including commodity-related information that includes at least one of items purchased by the user at any time by any purchasing method and data relating to the items purchased.

9. An information management method adopted in an information management system for a network, which comprises: a database that stores first user information, the first user information comprising personal information of a user and predetermined information relating to the user; and a network server that stores third user information, the third user information comprising second user information associated with the user and the predetermined information relating to the user, wherein the second user information comprising at least some of the personal information of the user, and in response to a specified requirement with a preset output condition sent from the user via an open network, outputs a user's exclusive page to the user who has sent the requirement, where the user's exclusive page includes at least part of the third user information corresponding to the user who has sent the requirement, said information management method comprising:

(a) accepting a requirement from the user with a preset permission condition via said network server, or through voice recognition, or through dial tone recognition, or through character recognition;

(b) creating third user information corresponding to the user based on the first user information stored in said database, and adjusting the third user information in response to the requirement with the preset permission condition;

(c) storing the adjusted third user information into said network server; and (d) displaying on the user's exclusive page all or part of the personal information of the user and the predetermined information relating to the user stored said database, regardless of the time of opening the user's exclusive page.

10. An information management method in accordance with claim 9, said (b) adjusting the third user information to include at least part of the personal information.

11. An information management method in accordance with claim 9, said (b) carrying out the adjustment to specify at least part of the first user information as the third user information.

12. An information management method in accordance with claim 9, said (b) selecting a piece of information to be included in the second user information, out of the personal information and adjusting the third user information based on the selected piece of information.

13. An information management method in accordance with claim 9, the predetermined information relating to the user including information relating to an item purchased by the user.

14. An information management method in accordance with claim 9, the predetermined information relating to the user including information relating to repair of an item purchased by the user.

15. An information management method in accordance with claim 9, the preset output condition being input of identification information allocated to the user for identification of the user.

16. An information management method in accordance with claim 9, the preset permission condition being input of identification permission information allocated to the user for identification of the user and for adjustment of the third user information and storage of the adjusted third user information into said network server.

17. An information management method in accordance with claim 9, the predetermined information relating to the user at least including commodity-related information that includes at least one of items purchased by the user at any time by any purchasing method and data relating to the items purchased.

* * * * *